(12) United States Patent
Ferraro et al.

(10) Patent No.: US 6,526,799 B2
(45) Date of Patent: Mar. 4, 2003

(54) METHOD OF FORMING A CASING FOR AN ELECTROCHEMICAL CELL

(75) Inventors: Charles R. Ferraro, Roxbury, CT (US); Sean A. Sargeant, Lagrange, GA (US); Jay Lucas, New Milford, CT (US); Keith Buckle, Sudbury, CT (US)

(73) Assignee: The Gillette Company, Boston, MA (US)

( * ) Notice: Subject to any disclaimer, the term of this patent is extended or adjusted under 35 U.S.C. 154(b) by 0 days.

(21) Appl. No.: 10/085,697

(22) Filed: Feb. 28, 2002

(65) Prior Publication Data

US 2002/0081490 A1 Jun. 27, 2002

Related U.S. Application Data

(62) Division of application No. 09/579,914, filed on May 26, 2000.

(51) Int. Cl.$^7$ .................................................. B21D 22/28
(52) U.S. Cl. ...................................... 72/349; 72/379.4
(58) Field of Search ......................... 72/347, 349, 379.4

(56) References Cited

U.S. PATENT DOCUMENTS

| | | | | |
|---|---|---|---|---|
| 3,924,437 A | * | 12/1975 | Hortig | 72/349 |
| 4,742,949 A | * | 5/1988 | Glerum et al. | 72/347 |
| 5,208,435 A | * | 5/1993 | Main et al. | 72/349 |
| 5,787,752 A | * | 8/1998 | Iwase et al. | 72/349 |

* cited by examiner

*Primary Examiner*—Lowell A. Larson
(74) *Attorney, Agent, or Firm*—Barry D. Josephs; Paul I. Douglas; Thomas G. Krivulka

(57) ABSTRACT

A casing for cylindrical electrochemical cells, for example, alkaline cells or lithium cells. The casing is characterized by having a non-uniform wall thickness. The casing comprises a cylindrical body surface, an open end and an integrally formed closed bottom. A portion of the casing body forms the peripheral edge of the casing at the open end thereof. The casing body surface has a wall thickness which is less than the wall thickness of the casing bottom. The casing has a peripheral edge which has a wall thickness which is greater than the wall thickness of the body surface. The peripheral edge wall thickness is desirably about the same or greater than the wall thickness of the casing bottom. The casing is formed by subjecting a sheet of metal to a series of discrete punching steps. A partially formed cup is punched through a die cavity in each step thereby progressively drawing the cup to a progressively reduced diameter and increased length. This is accomplished desirably without changing any portion of the cup's wall thickness. The cup is subjected to a finishing step wherein the wall thickness of the body surface is reduced without altering the wall thickness of the bottom. The wall thickness of the peripheral edge remains the same or is increased in the finishing step.

10 Claims, 6 Drawing Sheets

METHOD OF FORMING A CASING FOR AN ELECTROCHEMICAL CELL

CROSS REFERENCE TO RELATED APPLICATIONS

This application is a Divisional of copending application Ser. No. 09/579,914 filed May 26, 2000.

FIELD OF THE INVENTION

The invention relates to casings for electrochemical cells, typically cylindrical casings, and a method of forming such casings.

BACKGROUND

The casings for electrochemical cells are typically elongated and of cylindrical shape. The casings are typically in the shape of a cylinder having a closed end and open end. Conventional alkaline cells or lithium cells which are in common usage today are representative of cells employing such cylindrical casings.

Primary alkaline cell typically have a cylindrical casing which contains zinc anode active material, alkaline electrolyte, preferably aqueous potassium hydroxide, a manganese dioxide cathode active material, and an electrolyte permeable separator film, typically comprising cellulose. Such cells have a fresh voltage of about 1.5 Volt and are in widespread use. (Alkaline cells as referenced herein shall be understood to be conventional commercial alkaline cells having an anode comprising zinc, a cathode comprising manganese dioxide, and an electrolyte comprising potassium hydroxide.) Primary (non-rechargeable) lithium cells can have a cylindrical casing typically containing an electrode composite comprising an anode formed of a sheet of lithium, a cathode formed of a coating of cathode active material comprising manganese dioxide or lithiated manganese dioxide on a conductive metal substrate such as a stainless steel mesh. The lithium cells can have a sheet of electrolyte permeable separator material between the anode and cathode sheets. The separator sheet is typically placed on opposite sides of the lithium anode sheet and the cathode sheet is placed against one of the separator sheets, thereby separating the anode and the cathode sheets. The electrolyte used is typically comprises a lithium salt such as lithium trifluoromethane sulfonate ($LiCF_3SO_3$) dissolved in a non-aqueous solvent. The electrode composite is spirally wound and inserted into the cell casing, for example, as shown in U.S. Pat. No. 4,707,421. Lithium cells having a cylindrical casing can be of varying size and commonly are in the form of cylindrical cells having about ⅔ the height of a conventional AA size alkaline cell or even smaller heights. The lithium cells have a voltage of about 3.0 volts which is twice that of conventional $Zn/MnO_2$ alkaline cells and also have higher energy density (watt-hrs per $cm^3$ of cell volume) than that of alkaline cells. Primary lithium cells are in widespread use as a power source for many conventional photographic flash cameras, which require operation at higher voltage and at higher power output than supplied by individual alkaline cells.

The cylindrical casings for such alkaline and lithium cells have good mechanical strength and corrosion resistance and are typically of steel such as nickel plated cold rolled or nickel plated stainless steel. The cylindrical casings are formed typically from a flat sheet of metal. The metal sheet can be held in place over a block die having a cylindrical channel opening in its surface. The channel opening can run through a portion of the die's thickness. The flat metal sheet can be drawn in a single stage or in a plurality of stages by action of a punch on the sheet until the casing of desired shape and diameter is obtained. If multiple staging is used to fabricate the casing, a series of block dies can be used each having a progressively smaller diameter channel opening. Thus, a metal sheet can be punched in the first stage to a first cup shape having a first diameter which is smaller than the diameter of the starting metal sheet. The cup product from the first stage die can be placed in a second stage die having a cylindrical channel opening of diameter less than the diameter of the first die opening. The cylindrical cup formed in the final stage is of the desired shape, diameter and length.

The casing can then be filled with active anode material, electrolyte and cathode material. An end cap assembly comprising a terminal plate with attached electrical insulator such as an insulator plug can then be placed in the open end of the casing. One of the anode or cathode is in electrical contact with the casing and the other is in electrical contact with the terminal plate. The peripheral edge of the casing at the casing open end can be crimped over the edge of the end cap assembly thereby sealing the casing with a portion the insulator between the casing and terminal plate. During crimping a portion of the casing can also be radially compressed around the end cap assembly to provide a tight seal.

It is desirable to design the cylindrical cell so that the amount of internal volume available for active material is as great as possible for a cell of given overall size. This results in increased cell capacity and service life. In order to accomplish this objective various designs of the end cap assembly, for example by flattening the end cap assembly or by using thinner insulator plugs, have been tried. Such designs have their limitations since the end cap assemblies typically include an insulator plug, and must be strong enough to withstand the crimping force needed to provide a tight seal. Another approach is to reduce the wall thickness of the casing. When conventional methods are used to form the casing, for example, by punching a flat sheet as above described, the casing wall thickness is uniform from one end of the casing to the other. If the casing is fabricated to wall thickness which is below a threshold level, the peripheral edge of the casing at the casing open end cannot be crimped effectively around the edge of the end cap assembly. For example, when the wall thickness of the casing peripheral edge thereof becomes too thin, the peripheral edge does not hold its crimped position with time but rather tends to spring back radially from its original crimped position. The "spring back" effect is a result of the change in physical properties occurring if the metal becomes thinned during the punching process. A casing peripheral edge which has been thinned results in a relaxation of the crimp forces around the end cap assembly and a gradual loosening of the seal between the casing and end cap assembly. This of course is undesirable since it can result in leakage of electrolyte from the cell and could also allow ambient moisture to seep into the cell. Also, if the wall thickness of the casing peripheral edge is too thin it may crack as the crimping forces are applied to it.

SUMMARY OF THE INVENTION

An aspect of the invention is directed to a casings for cylindrical electrochemical cells, for example, alkaline cells having an anode comprising zinc and a cathode comprising manganese dioxide, or lithium cells, comprising lithium metal anode and cathode comprising manganese dioxide or lithiated manganese dioxide. The casing of the invention is characterized by having a non-uniform wall thickness. The casing of the invention is not intended to be restricted to any one cell size. Thus, the casing having non-uniform wall thickness can be made with varying overall length and diameter so that it can be used as a casing for any desired cylindrical cell size, for example, AAAA, AAA, AA, C or D, ⅔ A size (same diameter as AA cell but ⅔ its length) or CR2 size (15 mm×25 mm). Thus, the casing of the invention has particular application to cells having an outside diameter between about 7 and 35 mm and a length of between about 20 mm and 60 mm. The casing comprises a cylindrical body surface, an open end and an integrally formed closed end. The closed end forms the cell bottom which functions as a cell terminal. The bottom can be flat or can have an integrally formed pip protruding from the center thereof. A peripheral edge of the casing at the open end thereof extends from the casing body. The peripheral edge desirably has a length of between 3 and 5 mm. The peripheral edge is preferably stepped so that it has an outside diameter which is greater than the outside diameter of the remainder of the casing body. After the casing is filled with active material, the casing is sealed by crimping the peripheral edge of the casing over an end cap assembly comprising a terminal plate and insulator plug.

In an aspect of the invention the casing peripheral edge has a wall thickness which is the same as the wall thickness of the casing bottom forming the closed end. Alternatively, the casing peripheral edge has a wall thickness which is even greater than the wall thickness of casing bottom. Desirably the casing body surface (excluding the casing peripheral edge) has a wall thickness which is less than both the casing bottom and peripheral edge. In a preferred embodiment the casing body surface (excluding the peripheral edge) has a wall thickness which is less than the casing bottom, and the casing peripheral edge has a wall thickness which is the same or greater than the wall thickness of the casing bottom. The casing is preferably of nickel plated steel having wall thickness between 0.003 and 0.015 inches (0.0762 and 0.381 mm). Preferably the casing bottom has a wall thickness of between about 0.006 and 0.015 inches (0.152 and 0.381 mm); the body surface (excluding peripheral edge) has a wall thickness which is between about 0.002 and 0.005 inches (0.0508 and 0.152 mm) less than the wall thickness of the casing bottom; and the peripheral edge has a wall thickness of between about 0.006 and 0.015 inches (0.152 and 0.381 mm). The body surface desirably has a wall thickness of between about 0.003 and 0.008 inches (0.0762 and 0.203 mm), preferably 0.006 inches (0.152 mm), the bottom has a wall thickness of between about 0.006 and 0.015 inches (0.152 and 0.381 mm), preferably 0.0088 inches (0.224 mm), and the peripheral edge has a wall thickness between about 0.006 and 0.015 inches (0.152 and 0.381 mm), preferably 0.009 inches (0.229 mm). The peripheral edge has a wall thickness desirably between about 0.002 and 0.006 inches (0.0508 and 0.152 mm) greater than the wall thickness of the body surface.

The casing is desirably formed by the process of the invention wherein a flat sheet of metal, preferably of nickel plated steel is first cut to a circular flat sheet in a preliminary punching step. The circular flat sheet is transferred to an intermediate punching station wherein it is drawn by punching it through a cavity within one or a series of dies. A cylindrical punch preferably of carbide steel is employed. A series of like intermediate punching steps can be used. If series of intermediate step are employed, the cup formed in one die is transferred to a next die having a cavity of reduced diameter. The cup is again punched through the die cavity in such next die with a punch of reduced diameter thereby further drawing the cup into a cup of progressively increased length and progressively reduced diameter. The tolerance between the outside surface of the punch and the inside surface of the die cavity in each of these intermediate steps is desirably between about 0.006 and 0.015 inches (0.152 and 0.381 mm) which is the range of the material thickness of the starting flat sheet. The force of the punch on the surface of the cup during the punch downstroke in each of the intermediate steps is between about 1000 and 1500 pounds force (4448 and 6672 Newtons). Such tolerance allows the cup diameter to be reduced and its length increased without altering any portion of the cup's wall thickness. Desirably the cup's wall thickness remains about the same in each of the like intermediate punching steps as the thickness of the starting flat metal sheet. The cup formed in the last of such intermediate punching steps is transferred to a finishing step wherein it is punched through the cavity in a finishing die. In the finishing step the cup is subjected to a one stroke action of a cylindrical punch forcing the cup through a finishing die cavity. The punching in the finishing die can further reduce the cup's diameter and can further increase the cup's length. As the punch, in a one stroke action, forces the cup through the finishing die cavity, the wall thickness of the cup body (exclusive of the peripheral edge) is ironed to reduce the wall thickness thereof. Thus, the wall thickness of the cup's body (exclusive of the cup's peripheral edge) becomes less than the wall thickness of the cup bottom, which desirably remains unaltered from the thickness of the starting sheet. Also during the same one stroke action of the punch, the wall thickness of the peripheral edge can remain unaltered or slightly increased by action of the metal being squeezed towards the cup's open end during the punching action. The force of the punch downstroke on the surface of the cup in the finishing step is between about 1500 and 2500 pounds force (6,672 and 11,120 Newtons). The tolerance between the punch surface and the inside surface of the die cavity in the finishing step is desirably between about 0.003 and 0.008 inches (0.0762 and 0.203 mm). Such tolerance helps to achieve the desired reduction in wall thickness of the cup's body surface resulting in a body surface wall thickness of between about 0.003 and 0.008 inches (0.0762 and 0.203 mm). The reduction in wall thickness of the cup's body surface increases the cell's interior volume for a given cell size thereby allowing more active material to be inserted into the cell. The reduction in wall thickness of the cup's body surface is accomplished without reducing the wall thickness of the cup's peripheral edge at the cup's open end. This makes it easier to achieve a tightly sealed cell during crimping of the peripheral edge over a terminal end cap assembly which is inserted into the cell's open end after the casing has been filled with active material.

The invention will be better understood with reference to the drawings in which.

DETAILED DESCRIPTION

Figure 1:
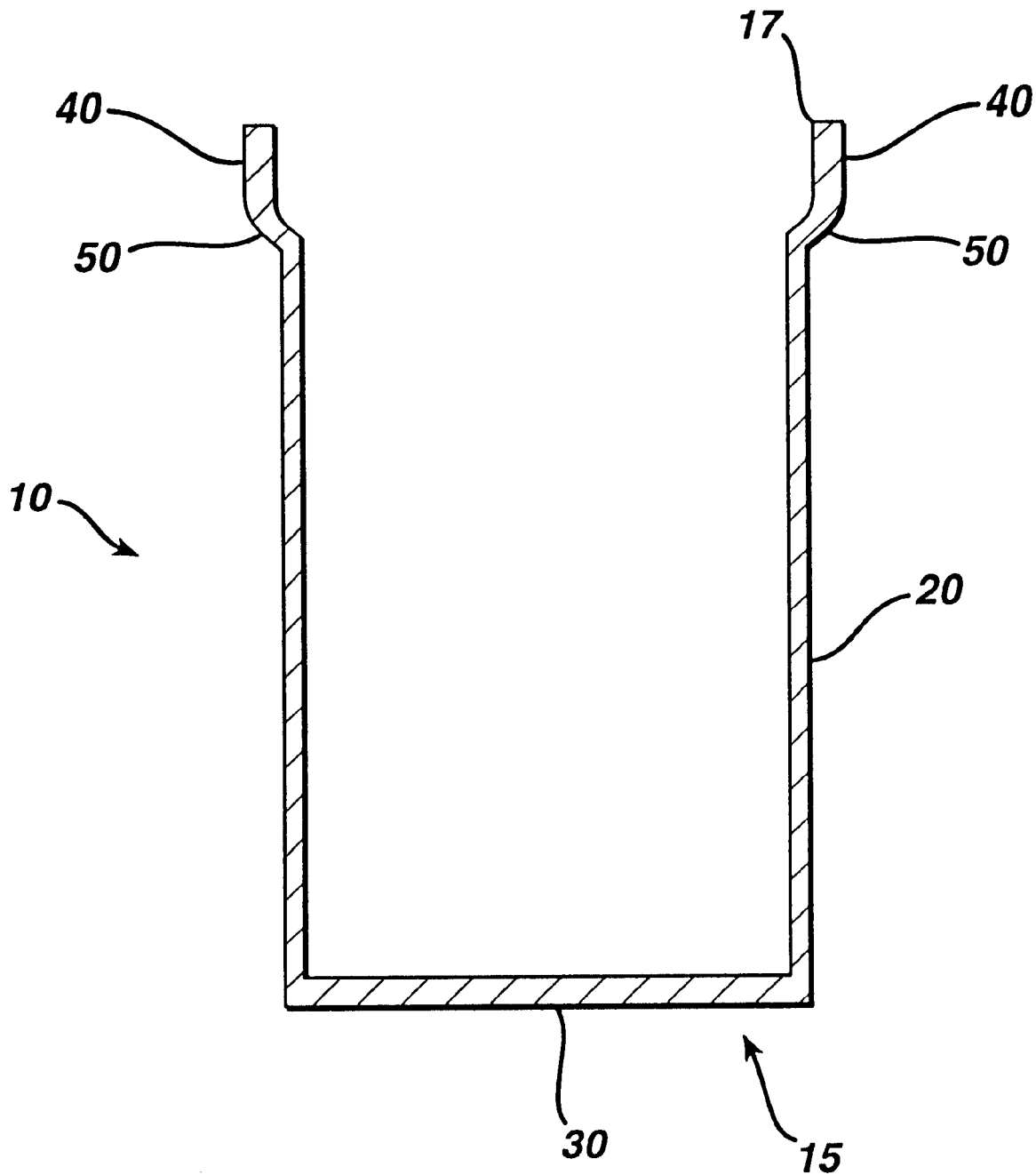
FIG. 1 is a cross sectional elevation view of the casing of the invention after the casing has been formed.

The casing shown in FIG. 1 is representative of a specific embodiment of the invention and shows a finished cylindrical casing designed for use as a casing for electrochemical cells, for example, Zn/$MnO_2$ alkaline cells or lithium/$MnO_2$ cells having an outside diameter between about 7 and 35 mm and a length of between about 20 mm and 60 mm. The casing 10 (FIG. 1) is a one piece construction of shaped metal, preferably nickel plated steel. Casing (cup) 10 is of cylindrical shape and has a closed end 15 and an open end 17. Casing 10 (FIG. 1) is characterized by a body 20, a bottom 30 forming closed end 15 and peripheral edge 40 at open end 17. Body 20, bottom 30 and peripheral edge 40 are integrally formed. The peripheral edge 40 has a length of between about 3 and 5 mm, irrespective of cell size. For example, such range in length of peripheral edge 40 applies to AA cell size as well as CR2 cell size. Peripheral edge 40 is preferably outwardly stepped with an in integrally formed transition surface SO forming the lower portion edge 40. Casing 10 is characterized by having a wall thickness of body 20 which is less than the wall thickness of bottom 30 and also having a wall thickness of peripheral edge 40 which is greater than the wall thickness of body 20. Desirably the peripheral edge 40 has a wall thickness which is the same as the wall thickness of bottom 30 and desirably is even greater than the wall thickness of bottom 30. In such latter case the peripheral edge 40 desirably has a wall Ad; thickness which is the same as the wall thickness of bottom 30 and desirably has wall thickness which is even greater than the wall thickness of bottom 30, yet the wall thickness of body 20 is less than the wall thickness of bottom 30. In a preferred embodiment the finished casing 10 can be a representative AA or CR2 size casing which has a wall thickness of bottom 30 of 0.0088 inches (0.224 mm), a wall thickness of body 20 of 0.006 inches (0.152 mm)and a wall thickness of peripheral edge 40 of 0.009 inches (0.229 mm).

The desired casing (cup) 10 is advantageously formed by the process of the invention which is a transfer process. The transfer process involves a series of steps wherein a partially formed casing is sequentially drawn in a series of punching stations. Each station has a punch and die. A first cup is formed from a circular flat sheet of metal by inserting the flat sheet onto a die in a first station wherein it is drawn into a cup by action of a punch pressing the sheet through a cavity in the die. The cup from the first station is transferred to a second die in a second station (intermediate station) wherein the cup is further drawn by action of a second punch which presses the cup through a second die aperture. In this step the cup's diameter is reduced and the cup's length is increased. This is accomplished desirably without changing any portion of the cup's wall thickness. That is, the wall thickness of the cup formed in the second (intermediate) station is desirably uniformly the same as the thickness of the starting flat sheet. The cup formed in the second station can optionally be transferred to one or more similar intermediate drawing stations, for example, a third station, wherein the cup's diameter is further reduced and its length is further increased by action of another punch which presses the cup through a third die aperture of reduced diameter. The cup's diameter is reduced and the cup's length is increased in the third station in a manner the same or similar to that employed in the second station, namely, desirably without changing any portion of the casing's wall thickness. The punch in each station can be a cylindrical mass of carbide steel.

Figure 3:
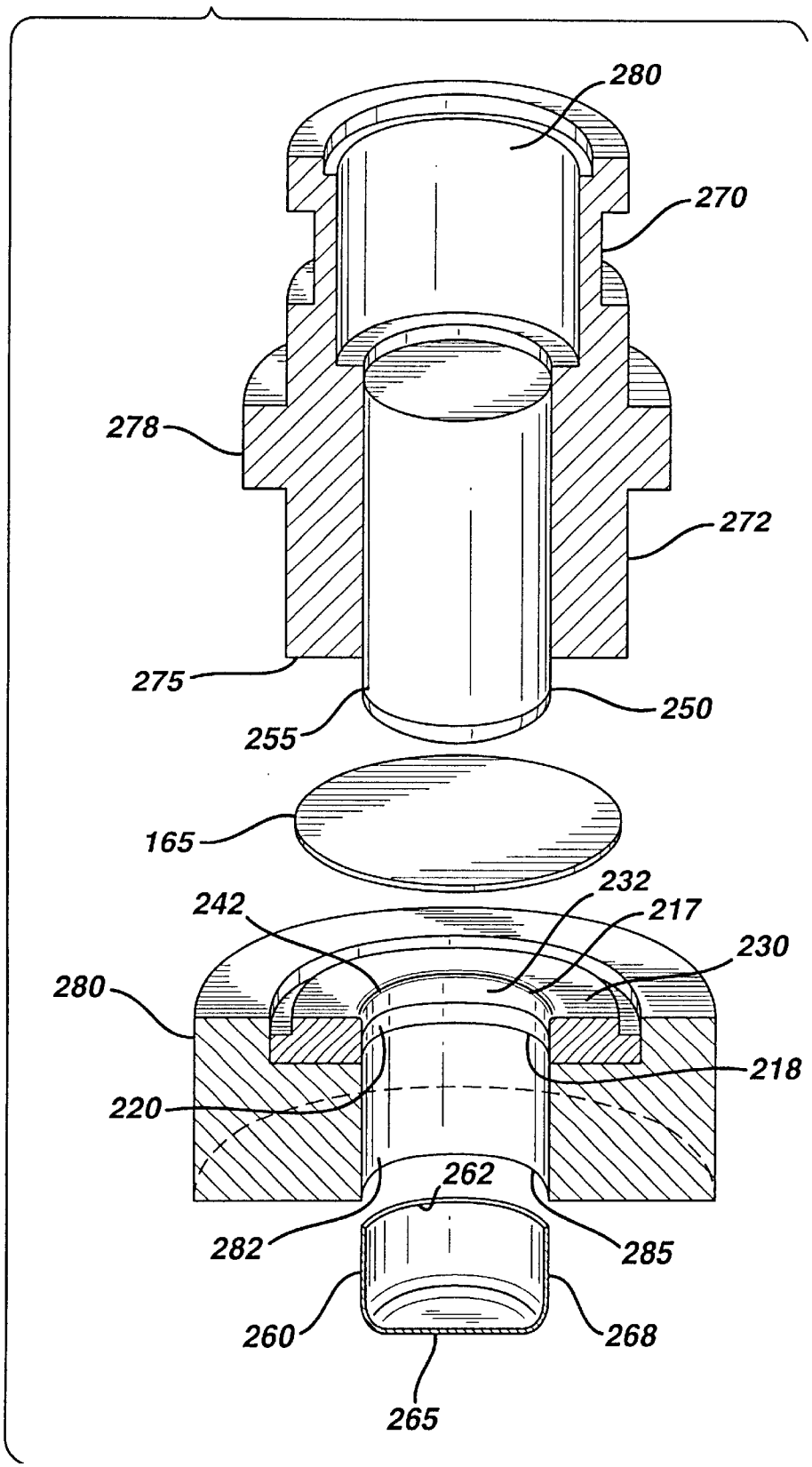
FIG. 3 is a perspective exploded view of the punch components used in a first intermediate step to draw a circular flat sheet of metal into a partially formed cup.

In like manner the cup formed in the third station can optionally be transferred to one or more additional intermediate stations. For example, the cup formed in the third station can be transferred sequentially to a fourth and fifth station wherein the cup's diameter is further reduced and the cup's length is further increased preferably without altering any portion of the cup's wall thickness. The cup formed in the last intermediate station is then transferred to a finishing station. The finishing station comprises a punch and die as in the preceding stations. The cup formed in the last intermediate station is inserted into a die aperture of the finishing station. The action of a cylindrical punch pressing the cup through the die aperture of the finishing station further reduces the cup's diameter and increases the cup's length. However, the tolerance between the punch and die cavity wall in the finishing station is adjusted and reduced to effect a change in a portion of the cup's wall thickness as the cup is pressed through the die cavity. Desirably, the wall thickness of the cup's body surface is reduced while the wall thickness of the cup's bottom is left unaltered as the cup is pressed thorough the finishing station. Also, as the cup is pressed through the die cavity in the finishing station, the wall thickness of the cup's peripheral edge at the cup's open end remains the same the same as the wall thickness of the cup's bottom. Preferably the wall thickness of said peripheral edge is actually increased over that of the wall thickness of the cup's bottom as some metal squeezes up towards the casing peripheral edge. Thus, the casing (cup) 10 formed by the process of the invention has a bottom 30 of the same wall thickness as the thickness of the starting flat metal sheet 165 (FIG. 3). The side wall 20 of the finished cup (FIG. 1) has a wall thickness which is less than the wall thickness of bottom 30 and the peripheral edge 40 has a wall thickness which can be the same as the wall thickness of bottom 30 and preferably peripheral edge 40 has a wall thickness which is greater than the wall thickness of bottom 30.

Figure 2:
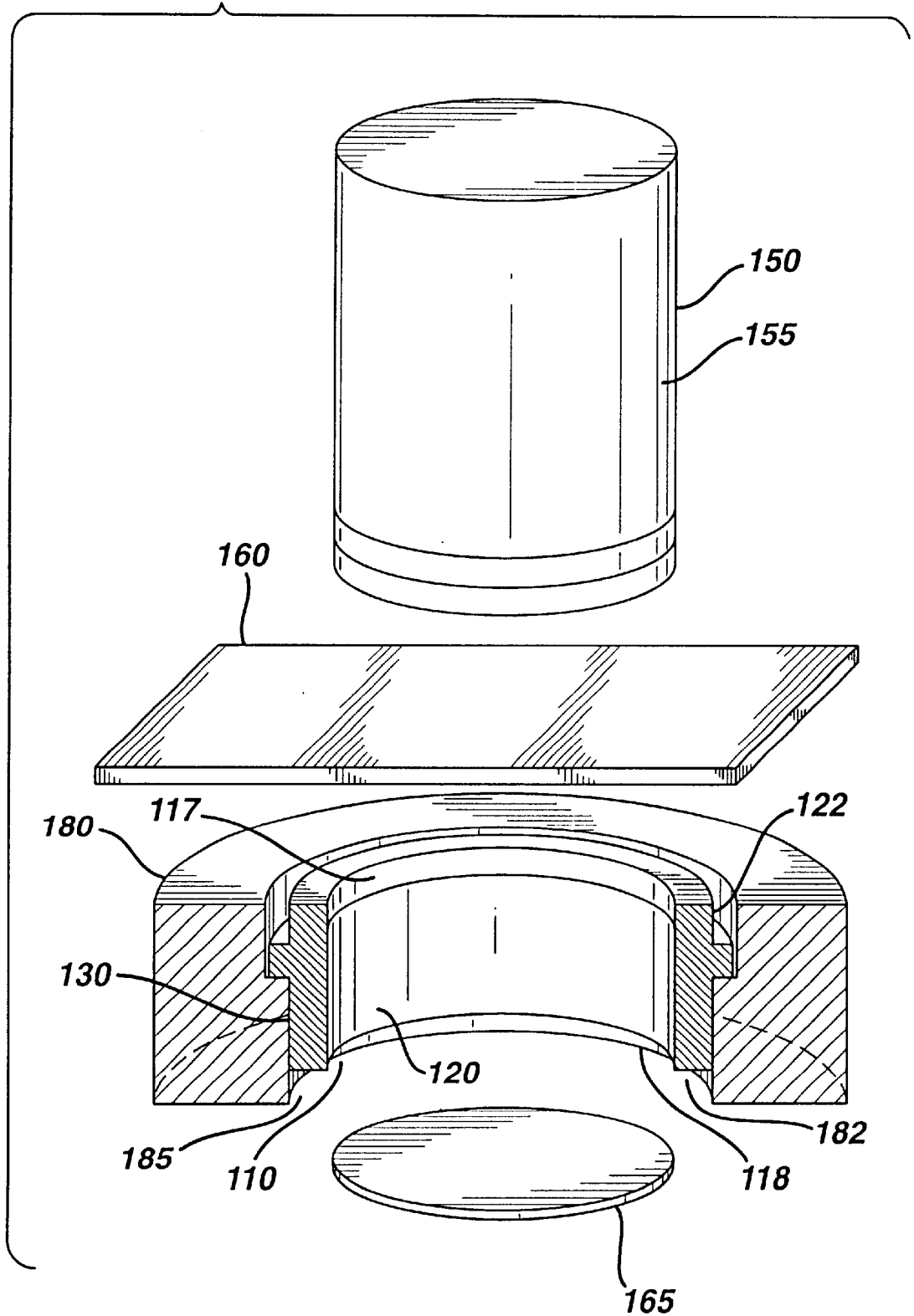
FIG. 2 is a perspective exploded view of the punch components used in a preliminary step to cut a flat sheet into a circular pattern.

In a specific embodiment, intended as a non limiting example, assume it is desired to fabricate a cylindrical casing for a AA size alkaline cell. The AA size casing has an outside diameter of about 13.9 mm, and a length of about 48.0 mm. In the process of the invention casing (cup) 10 is formed in a series of drawing steps from a starting flat sheet 160 (FIG. 2) of metal, preferably nickel plated steel. If a nickel plated steel sheet is used, it can have a thickness of about 0.008 inches. In a preliminary step the flat sheet 160 (FIG. 2) is secured in place over a block die 130. Die 130 can be housed within a block holder 180 as shown in FIG. 2. Die Cavity 110 has a top open end 117 and bottom open end 118. Block holder 180 has a cylindrical channel 182 running therethrough in alignment with cavity 110 in the die. Channel 182 terminates at a bottom open end 185. Thus a continuous channel is formed through die 130 and holder 180. Block die 130 is preferably of cobalt tool steel and holder 180 can be of carbide steel. Block die 130 has a cylindrical body 122 and a cavity 110 running therethrough defined by inside wall surface 120. Inside wall 120 has a cylindrical shape.

Sheet 160 is secured in place over cavity 110 of die 130 as shown in the preliminary station of FIG. 2. A punch 150 is placed in alignment over metal sheet 160. Punch 150 can be hydraulically or motor driven. Punch head 150 is preferably a cylindrical block carbide steel and is shaped to fit snugly within cavity 110. Preferably the punch 150 is sized so that there is a tolerance of about 0.0005 inches (0.012 mm) between the punch surface 155 and die cavity wall 120. With such tolerance as punch 150 presses onto nickel plated steel sheet 160, a circular flat portion 165 is cut therefrom.

The cut portion has a diameter of about 2.160 inches (54.87 mm) if it is desired to fabricate a casing for a AA cell as in this example.

Cut sheet 165 is then transferred to a first cup forming station (FIG. 3) wherein it is placed over cavity 232 in die 230. A cylindrical punch 250 of carbide steel is slideably housed within a sleeve 270. Sleeve 270 can be of carbide steel or cobalt steel. A die 230 of carbide steel is housed within a block holder 280. Block holder 280 can be of cobalt steel. Die 230 has a cylindrical cavity 232 running through its body. Cavity 232 is defined by inside wall 220 of the die. Thus, cavity 232 forms a top open end 217 and bottom open end 218 in the die. Die 230 also has a slight beveled surface 242 extending outwardly from the inside wall 220 at the die's top open end 217. Block holder 280. has cylindrical channel 282 therethrough in alignment with die cavity 232. Channel 282 terminates at a bottom open end 285. Thus a continuous channel is formed through die 230 and holder 280. Punch 250 can have a diameter of about 1.20 inches (30.50 mm). The tolerance between the surface 255 of punch 250 and the inside wall 220 of die 230 is desirably about 0.0088 inches (0.224 mm). Die 230 has a length of about ⅜ inches (0.015 mm). The flat circular starting metal sheet 165, preferably of nickel plated steel is placed over cavity 232 of die 230. A sleeve 270 having an outside surface 272, channel 280, and holding flange 278 is provided for punch 250. Punch 250 is slideably mounted within sleeve channel 280. Sleeve 270 is positioned over flat sheet 165 so that the bottom edge 275 of sleeve 270 contacts the edge of metal sheet 165. With metal sheet 165 so positioned over die cavity 232 and with the edge 272 of the sleeve over the edge of sheet 165, punch 250 is pressed onto sheet 165 with a downstroke force about 1500 pounds (6,672 Newtons). The force of the punch causes metal sheet 165 to become slightly heated and forced through die cavity 232 thereby transforming its shape into cup 260. Immediately after cup 260 is formed, punch 250 and sleeve 270 are retracted in an upstroke from die 230. The punch cycle, with one cycle comprising both downstroke and upstroke, can typically be between about 50 and 200 cycles per minute. (The downstroke and upstroke time is typically the same.) Cup 260 has a cylindrical body 268, a closed (bottom) end 265 and open end 262. The diameter of formed cup 260 is about 1.25 inches (31.70 mm) which is the diameter of the die cavity 232. Thus, the first punching operation desirably reduces the diameter of flat sheet 165 by about 40%. The length of formed cup 260 is about 0.5 inches (12.7 mm). The cup 260 wall thickness in this first punching step remains the same as the thickness of starting sheet 165. Thus, the wall thickness of cup body 268 and cup bottom 265 is uniformly the same as the thickness of flat sheet 165, namely, 0.0088 inches (0.224 mm).

After cup 260 has been formed, it is pushed out of die cavity 232 by inserting a pin through the bottom of block holder channel 282 and forcing the cup up through the die cavity top open end 217. Cup 260 is then transferred to a second or series of intermediate punching stations. The cup's diameter is further reduced and the cup's length is further increased in the intermediate punching stations. This can be accomplished in one or a series of like intermediate punching stations. In such intermediate punching stations the cup's wall thickness, namely, the thickness of the cup's closed bottom 265 and body surface 268 is desirably not altered. That is, the wall thickness of the cup's body surface and closed bottom desirably remains the same as the thickness of the starting flat sheet 165.

Figure 4:
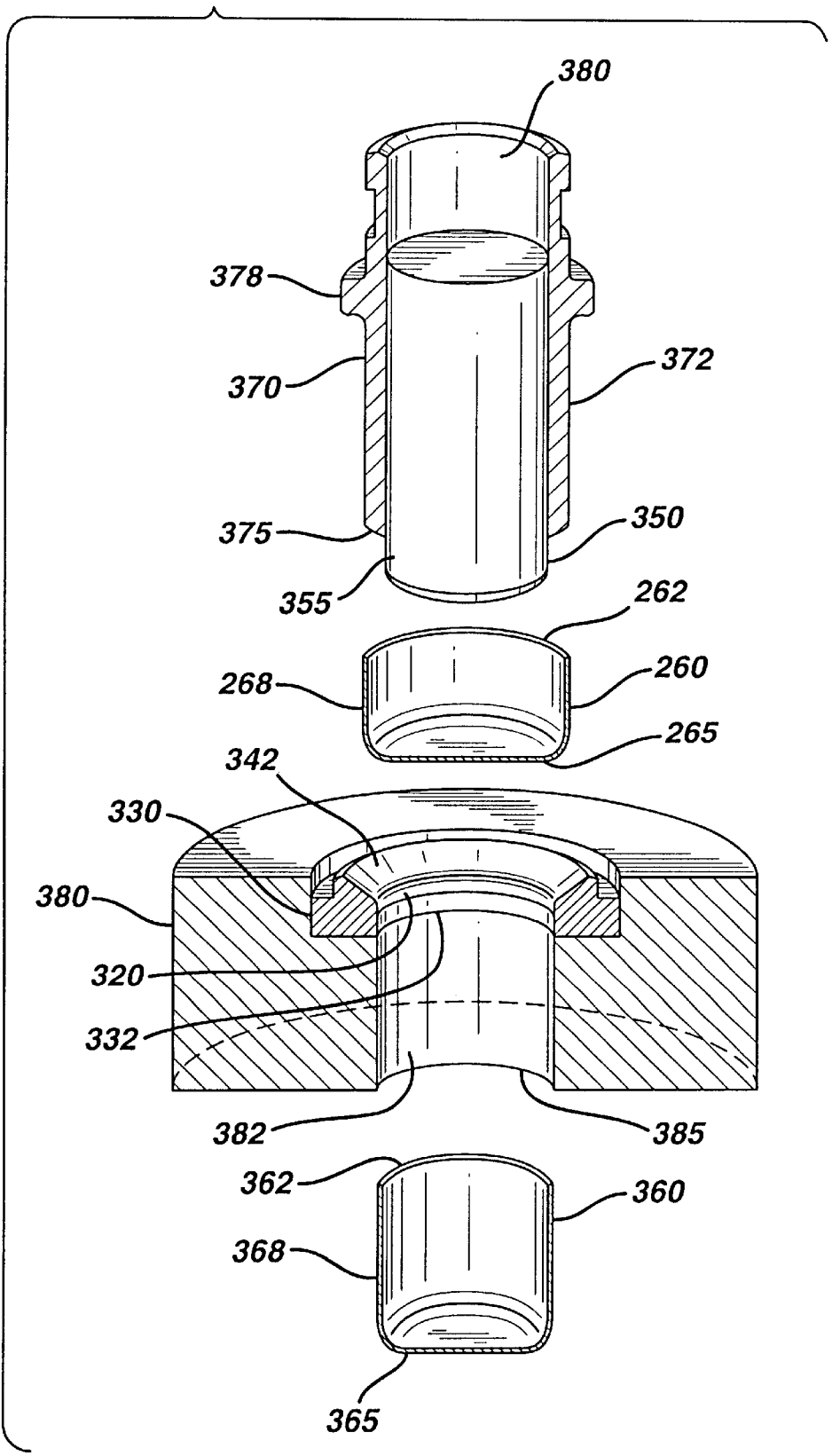
FIG. 4 is a perspective exploded view of the punch components used in a second intermediate step to further draw the partially formed cup shown in FIG. 3.

The cup 260 formed in the first cup forming station (FIG. 3) is transferred to a second (intermediate) cup forming station (FIG. 4). The station shown is FIG. 4 is similar to that shown in FIG. 3 and has essentially all of the same components and materials as that shown and described with respect to FIG. 3. Namely, a cylindrical punch 350 is housed within a sleeve 370. Punch 350 is slideable within sleeve 370. A die 330 is housed within a block holder 380 similar to that described with reference to FIG. 3. Die 330 has a cylindrical cavity 232 running through its body. Cavity 332 is defined by inside wall 220 of the die. Thus, cavity 332 forms a top open end 317 and bottom open end 318 in the die. Die 330 also has a slight beveled surface 342 at the die's top open end 317. Beveled surface 342 extends outwardly from the inside wall 320. Block holder 380 has cylindrical channel 382 therethrough in alignment with die cavity 332. Channel 382 terminates at a bottom open end 385. Thus a continuous channel is formed through die 330 and holder 380. Punch 350 can have a diameter of about 0.958 inches (24.33 mm). Die 330 can have a length of about ⅜ inches (0.015 mm). The a tolerance between the surface 355 of punch 350 and the wall 320 of die cavity 332 is desirably about 0.0088 inches (0.224 mm).

The cup 260 is placed over cavity 332 of die 320. Sleeve 370 is inserted within the cup 260 through cup open end 262 so that the outside surface 372 of sleeve 370 is flush against the inside wall of cup body 268, and the bottom edge 375 of sleeve 370 rests against the inside surface of the cup bottom 265. Cup 260 with sleeve 372 therein is positioned over die cavity 332 so that the edge of cup bottom 265 rests against beveled surface 342 at the top open end 317 of die 330. With the cup 260 so positioned over die cavity 332, punch 350 is pressed into cup 260 so that the bottom of the punch pushes against the inside surface of cup bottom 265.

Punch 350 is pressed into cup 260 with a downstroke force of 1500 pounds (6672 Newtons). The force of the punch against the inside bottom surface 265 of the cup causes the cup to become slightly heated and forced through die cavity 332 thereby causing a reduction in the cup's diameter and an increase in the cup's length. The newly reformed cup is shown as cup 360. Immediately after cup 360 is formed punch 350 lifted through die cavity 332 and away from die 330 in an upstroke. The punch cycle, with one cycle comprising both downstroke and upstroke, can typically be between about 50 and 200 cycles per minute. The reformed cup 360 has a cylindrical body 368, a closed (bottom) end 365 and open end 362. The diameter of reformed cup 360 is about 0.980 inches (24.90 mm). Thus, the second punching operation desirably reduces the diameter of the input cup 260 by about 20%. The length of reformed cup 360 is about ⅞ inches (22.23 mm). The cup 360 wall thickness in this second punching step remains the same as the wall thickness of input cup 260. Thus, the wall thickness of cup body 368 and cup bottom 365 is uniformly the same as the wall thickness of cup 260, namely, 0.0088 inches (0.224 mm). After cup 360 has been formed and the punch 350 and sleeve 370 retracted the cup is pushed out of die cavity 332 by inserting a pin through the bottom of block holder channel 382 thereby forcing the cup up through the die cavity top open end 317.

The reformed cup 360 is then preferably transferred to two more like intermediate stations. These stations can have components and materials the same as that described with reference to FIG. 4, except that the punch diameter and die cavity diameter are progressively reduced. The description with respect to placement of the cup over the die, stroking of the punch and removal of the cup from the die are all the same as described with respect to FIG. 4.

Figure 5:
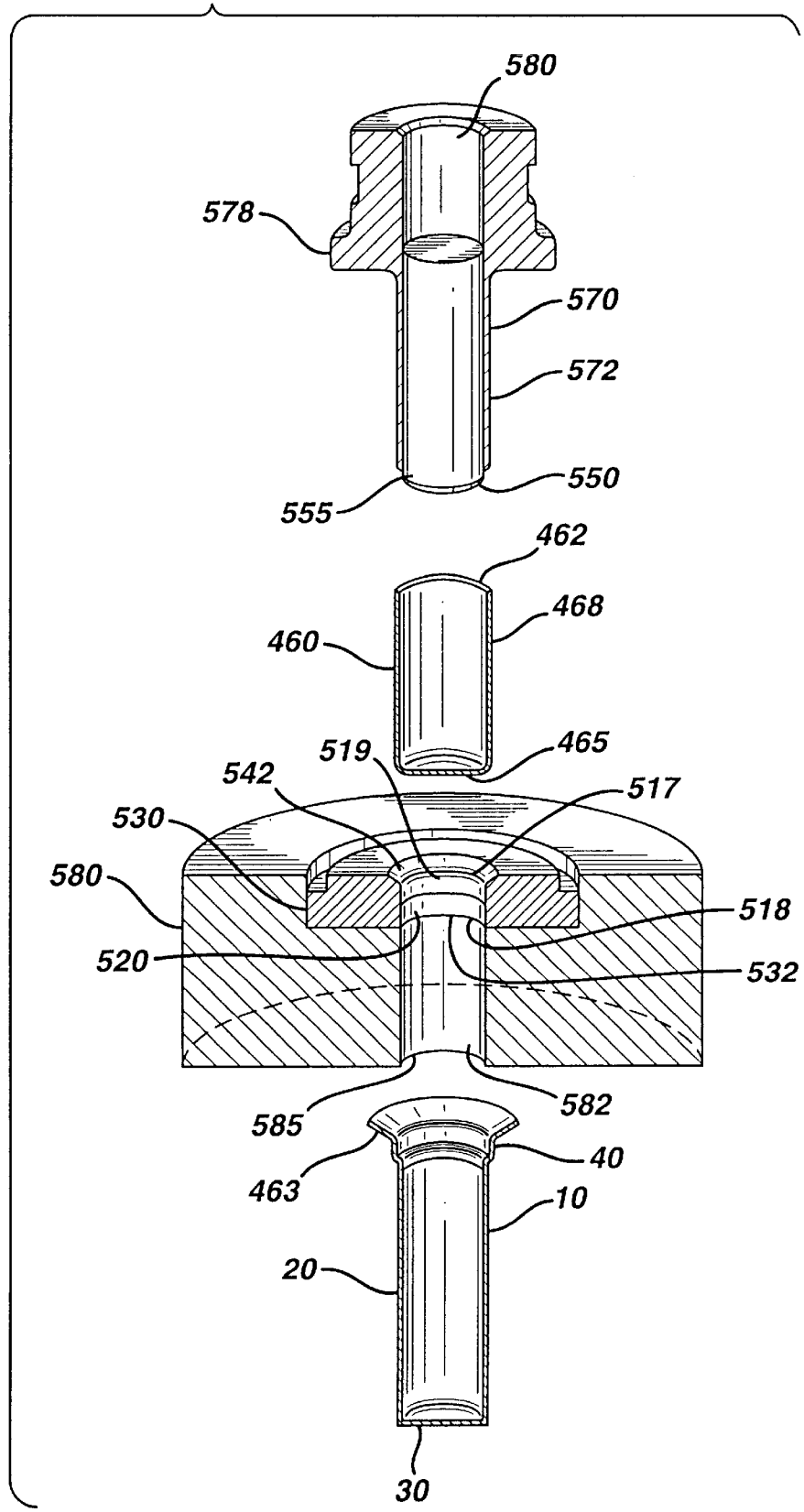
FIG. 5 is a perspective exploded view of the punch components used in a finishing step to further draw the partially formed cup of FIG. 4 into a finished cup.

Specifically, cup 360 can be transferred to a third station (not shown) having the same components as described with respect to the second station (FIG. 4) except that the punch diameter can be 0.764 inches (19.40 mm). The tolerance between the punch surface and the inside wall of the die is desirably about 0.0088 inches (0.224 mm). The punch stroke pressure can also be the same as described in the second station (FIG. 4). The cup can be reformed in said third station so that its diameter is reduced to 0.781 inches (19.83 mm) and its length is increased to 1 5/16 inches (19.83 mm). The cup formed in the third station desirably has the same uniform wall thickness of 0.0088 inches (0.224 mm) in all of its surfaces as the cup formed in the second station. That is, the cup's diameter has been reduced and the cup's length has been increased in the third station without altering any portion of the cup's wall thickness. That is, the wall thickness of the cup's body surface and bottom as reformed in the third station remains as 0.0088 inches (0.224 mm). The cup reformed in the third station can then be transferred to a like fourth station. This station can have all components and materials the same as that of the third station, except that the punch diameter and die cavity diameter are again reduced. The punch diameter can be 0.629 inches (15.98 mm). The tolerance between the punch surface and the inside wall of the die is desirably about 0.0088 inches (0.224 mm). The punch stroke pressure can also be the same as described in the second station (FIG. 4). The cup can be reformed in said fourth station (not shown) to produce a cup 460 which is subsequently transferred to a finishing station (FIG. 5). The cup 460 reformed in said fourth station has a diameter reduced in the fourth station to a value of 0.646 inches (16.40 mm) and a length which was increased to a value of 1.75 inches (44.45 mm). The reformed cup 460 desirably has the same uniform wall thickness of 0.008 inches as the input cup from the third station. That is, the cup's diameter has been reduced and the cup's length has been increased in the fourth station without altering any portion of the cup's wall thickness.

The cup 460 so reformed in the fourth station can then be transferred to a finishing station shown in FIG. 5. The finishing station has components and materials similar to that shown and described with respect to FIG. 4. Namely, punch 550 is a cylindrical mass of carbide steel. Die 530 is of carbide steel. Holder 580 is of cobalt steel and sleeve 570 is of carbide steel. However, unlike the preceding stations a portion of the cup wall thickness is altered in the finishing station (FIG. 5). Specifically with reference to FIG. 5 cylindrical punch 550 is slideably mounted within channel 580 of sleeve 570. Sleeve 570 has a holding flange 578 for holding and positioning the sleeve. Die 530 has a cavity 532 defined by cylindrical inside wall surface 520 running through the die body. Cavity 532 runs through the die body and extends through the top and bottom of the die, thus forming top open end 517 and bottom open end 518. Die 530 also has a flared beveled surface 542 at the die's top open end 517. Beveled surface 542 extends outwardly from the die cavity wall 520. A portion of the die cavity wall 519 immediately below bevel 542 can be shaped outwardly to produce the outwardly stepped peripheral edge 40 of finished casing 10. Block holder 580 has cylindrical channel 582 therethrough in alignment with die cavity 532. Channel 582 terminates at a bottom open end 585. Thus, a continuous channel is formed through die 530 and holder 580. Punch 550 can have a diameter of about 0.530 inches (13.46 mm). Die 530 has a length of about 3/8 inches (9.53 mm). The tolerance between the surface 555 of punch 550 and the inside wall 520 of die 530 in the finishing station (FIG. 5) is desirably about 0.006 inches (0.152 mm). The cup 460 from the preceding station is placed over cavity 532 of die 520. Sleeve 570 is placed into open end 462 of cup 460 so that the outside surface 572 of sleeve 570 is flush against the inside wall of the cup body 468, and the bottom edge 575 of sleeve rests against the inside surface of cup bottom 465. Cup 460 with sleeve surface 572 therein is positioned over die cavity 532 so that the edge of bottom 465 of the cup rests against beveled surface 542 at the top open end 517 of die 530. With the cup 460 so positioned over die cavity 532, punch 550 is pressed into cup 460 in a single downward stroke so that the bottom of the punch pushes against the inside surface of cup bottom 465 thereby reforming the cup into a finished cup 10 as shown in FIG. 5. The action of the punch downstroke on cup 460 reduces the diameter of the cup and increases the cup's length resulting in a finished cup 10 having the required diameter and length for the casing of an AA cell.

Also, the action of the punch 550 downstroke on cup 460 simultaneously reduces the wall thickness of the cup's body surface 468 as the cup is punched through die cavity 532 to reform the cup into finished cup 10. Thus the reformed finished cup 10 has a body surface 20 which has been reduced from 0.0088 inches (0.224 mm) to 0.006 inches (0.152 mm) by action of punch 550 pressing the cup 460 through die cavity 532 (FIG. 5). The wall thickness of the finished cup bottom 30 desirably remains unaltered at 0.0088 inches (0.224 mm). Also, the cup's peripheral edge 40 is stepped outwardly as cup 460 is punched thorough die cavity 532. The stepped peripheral edge 40 has a length of about 4 mm. The wall thickness of stepped peripheral edge 40 remains the same as the wall thickness of input cup 460, namely 0.088 inches (0.224 mm), but preferably is actually increased to a value of 0.009 inches (0.229 mm), as cup 460 is punched through die cavity 532. The reduction in wall thickness of the cup's body surface 468 resulting in a finished body surface 20 having a wall thickness of 0.006 inches (0.152 mm) compared to 0.0088 (0.224 mm) inches wall thickness of input body surface 468 is accomplished in the same single stroke of punch 550 forcing cup 460 thorough die cavity 532. The reduction in wall thickness of the cup's body surface is achieved by reducing the tolerance between the punch surface 558 and the die cavity wall 520 to a value of about 0.006 inches (0.152 mm). This is less than the tolerance used in the previous stations, e.g as described with respect to FIG. 4.

Preferably, the wall thickness of stepped peripheral edge is increased from 0.0088 inches (0.224 mm) to about 0.009 inches (0.229 mm) also during the same single downstroke of punch 550 on input cup 460. Thus, the same single stroke of the punch on input cup 460 simultaneously reduces the cup's body outside diameter to a value of about 13.9 mm and increases the cup's length to a final length of about 48.5 mm. This is the required diameter and length needed for an AA cell casing before the peripheral edge of the casing is crimped over a terminal end cap after active material has been inserted into the casing. The reduction in tolerance between the surface of punch 550 and the inside wall 520 of die 560 produces an "ironing" effect on the cup's side body 468 as the punch presses the cup 460 through die cavity 532. Such "ironing" action reduces the side wall thickness to a value from 0.0088 inches (0.224 mm) to 0.006 inches (0.152 mm) and even as low as 0.003 inches (0.0762 mm). The "ironing" of the cup's side wall 468 also changes some of the physical properties of the nickel plated steel forming the wall, mainly it increase the hardness of the steel in this region. It has been determined that if the single punching stoke is employed in the finishing step (FIG. 5) and the tolerance between punch 550 surface and the die cavity wall 520 is controlled to a value of between about 0.003 inches (0.0762 mm) and 0.008 inches (0.203 mm), the cup's die wall thickness can be reduced in this manner while simultaneously increasing the thickness of the peripheral edge 40 of the cup. The increase in the peripheral edge thickness is caused by the flow of some metal actually moving towards the open end of the cup as the punch pushes cup 460 through die cavity 532 in a single stroke action. The cup 10 resulting from the finishing step as shown in FIG. 5 has a flared portion 463 extending from the stepped peripheral edge 40. The flared portion is cut off to form the final finished casing 10 with outwardly stepped peripheral edge 40 as above described which can then used in cell assembly. The bevel 542 at the top open end 517 of the die is designed to provide an outwardly stepped peripheral edge 40 as shown in FIG. 5. The final casing 10 formed by the process of the invention, thus results in an improved casing which can be used as a casing for AA size alkaline cell. The casing 10 has an advantage over prior art casing in that the body surface (side wall) thickness has been reduced thereby allowing for insertion of more active material into the casing during cell assembly. This is accomplished while not reducing the wall thickness of the casing peripheral edge. In fact the wall thickness of the casing peripheral edge 40 can even be increased as above described during the finishing step described with reference to FIG. 5. Thus the peripheral edge 40 of the finished casing 10 has not be subjected to "ironing" and accompanying reduction in wall thickness as cup 460 is punched through die cavity 532. The peripheral edge therefore remains soft and pliable and does not have a tendency to "spring back" after it has been crimped over a terminal end cap in conventional manner during cell assembly.

Although the process of the invention has been described with respect to a specific embodiment having a series of punching steps, the casing could be formed in fewer steps, for example having only one intermediate step. In such alternative embodiment a flat metal sheet, for example, of nickel plated steel which has been precut into a circle can be punched into a partially formed cup using the processing components, materials and methods as described with reference to the first cup forming station FIG. 3. The cup formed in this one step can then be transferred directly to the finishing step described with reference to FIG. 5. The finishing step can be as described above with reference to FIG. 5 resulting in the final cup having reduced body surface wall thickness but unaltered or increased thickness of the cup's peripheral edge. Such two step process is especially attractive when shorter casing are desired, for example, casings used in primary lithium CR2 cells which have a length of about 25 mm and a diameter of about 15 mm.

The casing 10 of the invention can be used in assembling an electrochemical cell, for example, an alkaline cell. The alkaline cell can have a cylindrical casing 10 formed by the above described method of the invention. The method of the invention is not intended to be restricted to application to any particular cell size. By way of non limiting example, the cylindrical casing 10 made by the method of the invention can be used as a casing for a AA cell shown in FIG. 6. The AA alkaline cell 100 (FIG. 6) is a cylindrical cell comprising a cylindrical casing 10 having an outside diameter of about 13.9 mm, and a length of about 48.5 mm before peripheral edge 40 has been crimped over end cap assembly 790. The casing 10 has a bottom 30 having a wall thickness is 0.0088 inches (0.224 mm), a body surface 20 having a wall thickness of 0.006 inches (0.152 mm), and a peripheral edge 40 having a wall thickness of 0.009 inches (0.229 mm). Thus, cell 100 may have an anode 780 comprising zinc, a cathode 720 comprising compacted manganese dioxide, and an electrolyte within the anode comprising potassium hydroxide. Additives may be employed, as conventional, to modify the cell chemistry. The alkaline cell may employ a conventional alkaline cell ion porous separator material 770, typically comprising rayon or cellulose, between anode 780 and cathode 720.

The cathode material 720 may have the following composition: Electrolytic manganese dioxide (80–86 wt %), graphite (7–10 wt %), and a 6 to 11 Normal "aqueous KOH electrolyte solution" (5 to 15 wt %). The aqueous KOH electrolyte solution may desirably contain between about 1 and 5 wt % ZnO. A preferred cathode mixture may contain about 82 wt. % electrolytic manganese dioxide (EMD), 8 wt % graphite and about 10 wt. % of a 7 Normal KOH electrolyte solution containing between about 1 and 5 wt % ZnO.

Figure 6:
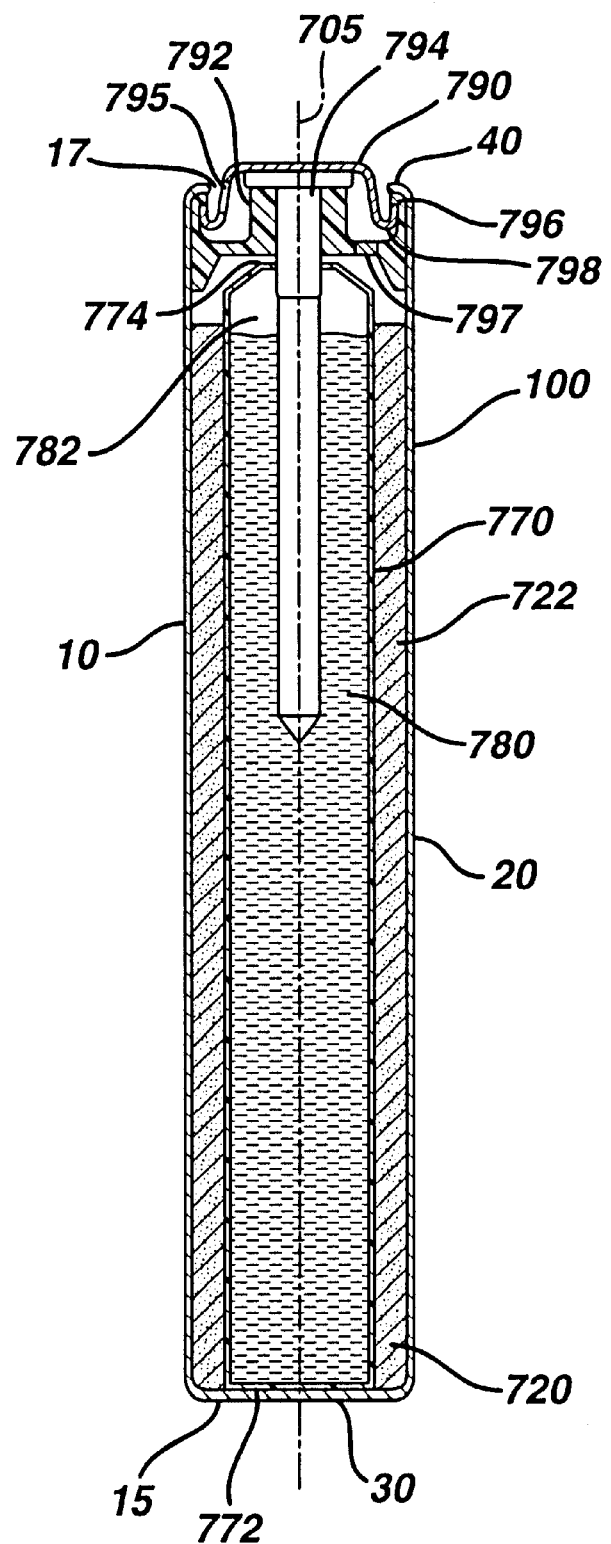
FIG. 6 is a cross sectional elevation view of the casing of the invention used in a completed cell.

The casing closed end 15 is can be an integrally formed flat bottom 30 as shown in FIG. 6. Bottom 30 can have an integrally formed terminal pip protruding from the center thereof. A separator 770 in the configuration of a tube having a closed end 772 and an open end 774 is inserted into the central cavity of casing casing 10 after cathode 720 has been inserted to fill the annular region 772. Separator 770 can be composed of ion porous separator material conventionally employed in alkaline cells, for example, of cellulosic or rayon material. Anode material 780 which can be in the form of a wet slurry can then be injected into central cavity (anode cavity) 782. The anode material 780 can be in the form of a gelled mixture containing mercury free (zero-added mercury) zinc alloy powder. Such mixture may typically contain aqueou s KOH electrolyte solution, gelling agent, e.g. acrylic acid copolymer such as CARBOPOL C940 from B.F. Goodrich; polyethoxy ester surfactant or anode mixtures in compositions as described in U.S. Pat. No. 5,401,590 herein incorporated by reference. Additional alkaline electrolyte comprising an aqueous solution of KOH (7 to 11 Normal) containing about 1 to 5 wt. percent ZnO can be added to the anode and cathode material within casing 10.

An end cap assembly 790 comprising a plastic insulating disk 792, end cap 795 with metal current collector 794 welded thereto can be inserted into the open end 17 of casing 10. End cap 795 may have one or more vent holes 798 in its surface and plastic insulating disk 792 may comprise an integrally disposed thin region 797 which functions as a rupturable membrane which is designed to rupture if gas build up within the cell reaches a predetermined value. The peripheral edge 40 of casing 10 can be crimped over the peripheral edge 796 of insulating disk 792 and the peripheral edge 798 of end cap 795, for example, by applying methods described in U.S. Pat. No. 5,150,602. Plastic insulating disk 792 may of polypropylene, talc filled polypropylene, sulfonated polyethylene or nylon. Current collector 794 may be selected from a variety of known electrically conductive metals found to be useful as current collector materials, for example, brass, tin plated brass, bronze, copper or indium plated brass. Current collector 794 is disposed in alignment with the cell's central longitudinal axis 705. End cap 795 may be constructed of a conductive metal having good mechanical strength and corrosion resistance such as nickel plated cold rolled steel or stainless steel, preferably, nickel plated low carbon steel.

Although the invention has been described with reference to specific embodiments, it should be understood that variations are possible without departing from the concept of the invention. Therefore, the invention is not intended to be limited to the specific embodiments but the scope of the invention is better reflected by the claims and equivalents thereof.

What is claimed is:

1. A method of forming a cylindrical casing for an electrochemical cell comprising the steps of:

(a) punching a sheet of metal through a cavity in a first die within a first punch step by the stroke of a first metal punch applied to a surface of said sheet thereby drawing said sheet into a cup shape having a cylindrical body surface, a closed end and an open end, wherein the wall thickness of said body surface and said closed end is the same as the thickness of said sheet of metal, and (b) transferring said cup to an intermediate punch step and punching said cup through a cavity in an intermediate die within said intermediate punch step producing a cup drawn to a longer length and smaller diameter than the cup produced in step (a);

(c) transferring said cup to another punch step after step (b) and punching said cup through a cavity in another die within said other punch step by the stroke of another metal punch contacting the inside surface of said cup to produce a further drawn cup having a cylindrical body surface, a closed end and an open end; wherein said cup is drawn to a longer length and smaller diameter as it passes through said other die; wherein the wall thickness of said body surface of said further drawn cup is less than the wall thickness of the closed end thereof; and wherein a stepped peripheral edge of said further drawn cup is formed during said punching through said other die; said peripheral edge integrally extending from said body surface at the open end of said cup; and wherein the inside diameter of said peripheral edge is greater than the inside diameter of said body surface of said further drawn cup and said peripheral edge has a wall thickness greater than the wall thickness of said body surface.

2. The method of claim 1 wherein said peripheral edge formed in step (c) has a length between about 3 and 5 mm.

3. The method of claim 1 wherein the metal sheet comprises nickel plated steel.

4. The method of claim 1 wherein the wall thickness of the body surface and closed end of the cup formed in step (b) is the same as the wall thickness of the body surface and closed end, respectively, of the cup formed in step (a).

5. The method of claim 1 wherein the wall thickness of said closed end of the cup formed in step (c) is between about 0.006 and 0.015 inches (0.152 and 0.381 mm) and the body surface of the cup formed in step (c) is between about 0.002 and 0.005 inches (0.0508 and 0.127 mm) less than the wall thickness of the closed end of the cup formed in step (c).

6. The method of claim 1 wherein the first metal punch in step (a) has a cylindrical surface and the tolerance between said first punch and the inside surface of the cavity of said first die is between 0.006 and 0.015 inches (0.152 and 0.381 mm).

7. The method of claim 1 wherein the metal punch in step (c) has a cylindrical surface and the tolerance between said punch and the inside surface of the cavity of said die in step (c) is between 0.003 and 0.015 inches (0.0762 and 0.381 mm).

8. The method of claim 1 wherein the metal punch in step (c) has a cylindrical surface and the tolerance between said punch and the inside surface of the cavity of said die in step (c) is between 0.003 and 0.008 inches (0.0762 and 0.203 mm).

9. The method of claim 1 wherein the punch in each of said steps comprises carbide steel.

10. The method of claim 1 wherein said punching in each of said steps is accomplished by a single stroke action of said respective punches in each of said steps.

* * * * *